(12) United States Patent
Whall

(10) Patent No.: US 7,080,665 B2
(45) Date of Patent: Jul. 25, 2006

(54) CONNECTOR APPARATUS AND METHOD OF COUPLING BIOPROCESSOR EQUIPMENT TO A MEDIA SOURCE

(75) Inventor: Joseph M. Whall, River Falls, WI (US)

(73) Assignee: Colder Products Company, St. Paul, MN (US)

( * ) Notice: Subject to any disclaimer, the term of this patent is extended or adjusted under 35 U.S.C. 154(b) by 0 days.

(21) Appl. No.: 10/926,737

(22) Filed: Aug. 26, 2004

(65) Prior Publication Data

US 2005/0076964 A1   Apr. 14, 2005

Related U.S. Application Data

(60) Provisional application No. 60/501,357, filed on Sep. 9, 2003.

(51) Int. Cl.
*F16K 1/02*  (2006.01)

(52) U.S. Cl. .................. 137/862; 137/625.48

(58) Field of Classification Search ............... 137/862, 137/625.48, 874; 251/92, 93, 149.6, 353; 285/305

See application file for complete search history.

(56) References Cited

U.S. PATENT DOCUMENTS

| | | | |
|---|---|---|---|
| 2,288,565 A * | 6/1942 | Green .................. 137/322 |
| 2,485,006 A | 10/1949 | Main, Jr. et al. |
| 2,631,001 A | 3/1953 | Griswold |
| 2,690,895 A | 10/1954 | Barcus |
| 3,094,306 A | 6/1963 | Conrad |
| 3,151,640 A | 10/1964 | Teston |
| 3,294,118 A | 12/1966 | Wieden et al. |
| 3,527,485 A * | 9/1970 | Goward et al. ............. 285/305 |
| 3,918,484 A | 11/1975 | Lamb |
| 4,190,231 A | 2/1980 | Vimercati |
| 4,314,689 A | 2/1982 | Wilson |
| 4,327,772 A * | 5/1982 | Kawabata ............... 137/625.48 |
| 4,366,816 A | 1/1983 | Bayard et al. |
| 4,423,741 A | 1/1984 | Levy |
| 4,557,261 A * | 12/1985 | Rügheimer ................. 604/533 |
| 4,742,851 A | 5/1988 | Lundblade |
| 4,757,919 A | 7/1988 | Smazik et al. |
| 4,991,821 A | 2/1991 | Beaston |
| 5,002,254 A | 3/1991 | Belisaire et al. |
| 5,052,725 A | 10/1991 | Meyer et al. |
| 5,261,454 A * | 11/1993 | Pavlica et al. ......... 137/625.48 |

(Continued)

FOREIGN PATENT DOCUMENTS

DE           736 348           6/1943

(Continued)

Primary Examiner—Eric Keasel
Assistant Examiner—Craig Price
(74) Attorney, Agent, or Firm—Merchant & Gould P.C.

(57) ABSTRACT

A connector apparatus designed for use in a bioprocessing assembly, and a method for coupling a piece of bioprocessing equipment to a media source in a sterilized environment. The connector apparatus includes a coupler including an end and at least one outlet, and a connector valve connectable at a first end to a fluid source, the connector valve including a valve member, the valve member being partially disposed within the coupler. The connector apparatus further includes a flow passage being actuatable from a closed configuration to an open configuration when the coupler and the connector valve are engaged, as well as being actuatable from an open configuration to a closed configuration. A clip member attached to the coupler allows the valve member to be moved from the closed configuration to the open configuration, and from the open configuration to the closed configuration.

21 Claims, 10 Drawing Sheets

U.S. PATENT DOCUMENTS

| | | | |
|---|---|---|---|
| 5,433,410 A | 7/1995 | Foltz | |
| 5,535,985 A | 7/1996 | Larbuisson | |
| 5,555,908 A | 9/1996 | Edwards et al. | |
| 5,609,195 A | 3/1997 | Stricklin et al. | |
| 5,794,823 A | 8/1998 | Roundtree | |
| 5,971,021 A * | 10/1999 | Graham | 137/625.48 |
| 6,041,805 A | 3/2000 | Gydesen et al. | |
| 6,231,089 B1 * | 5/2001 | DeCler et al. | 285/308 |
| 6,279,610 B1 * | 8/2001 | Fan | 137/625.48 |
| 6,311,727 B1 * | 11/2001 | Campau | 137/625.48 |
| 6,871,669 B1 | 3/2005 | Meyer et al. | |
| 6,902,144 B1 * | 6/2005 | deCler | 251/149.8 |
| 2002/0129858 A1 | 9/2002 | Meyer et al. | |
| 2004/0135111 A1 | 7/2004 | deCler | |
| 2005/0072479 A1 * | 4/2005 | Wuollet et al. | 137/625.48 |
| 2005/0084410 A1 | 4/2005 | Meyer et al. | |

FOREIGN PATENT DOCUMENTS

| | | |
|---|---|---|
| DE | 44 14 275 | 10/1995 |
| FR | 1 397 730 | 4/1965 |
| FR | 1488386 | 7/1967 |
| JP | 2-195866 | 8/1990 |

* cited by examiner

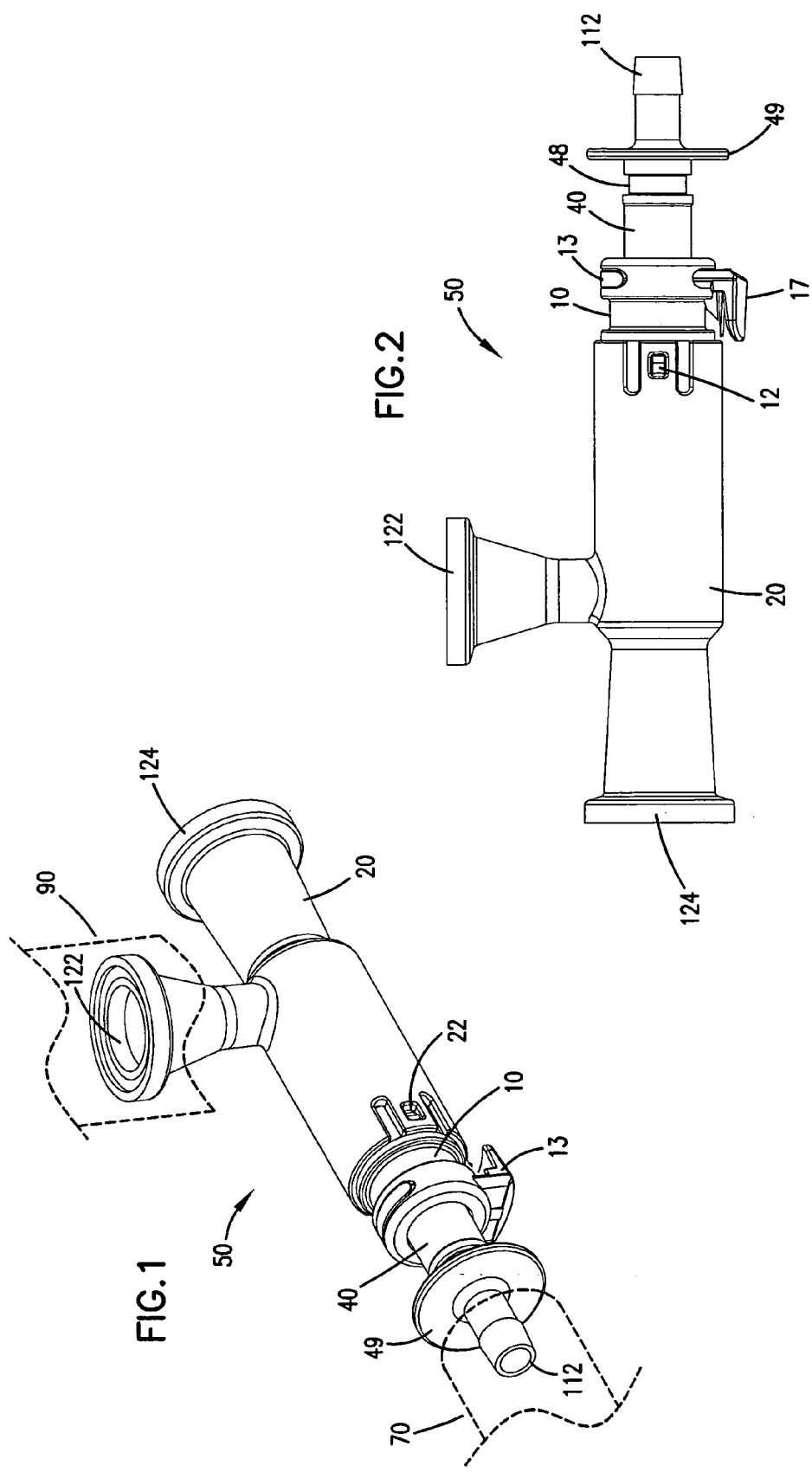

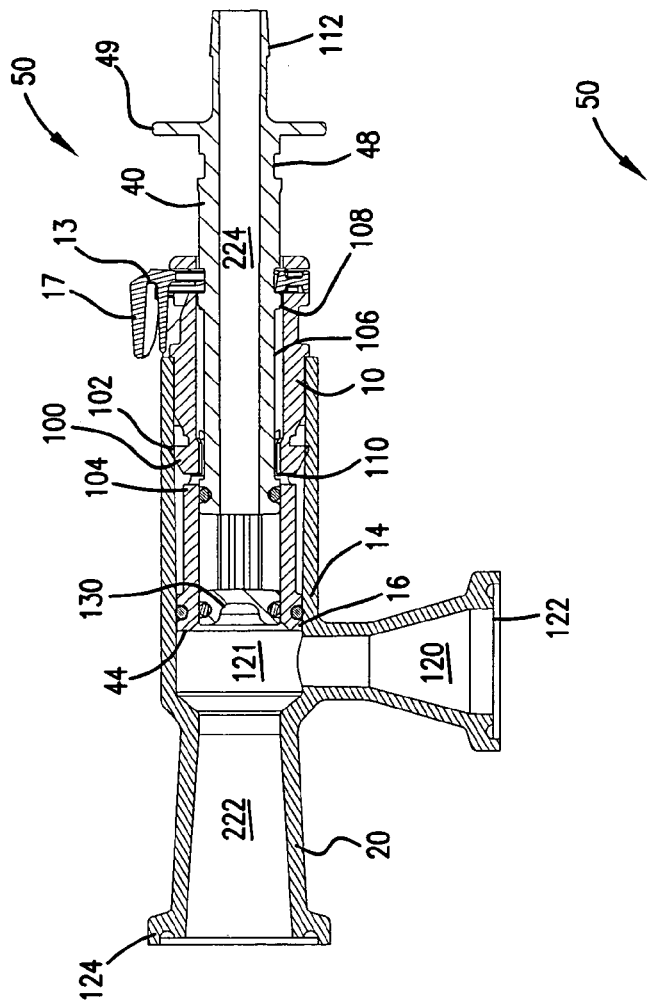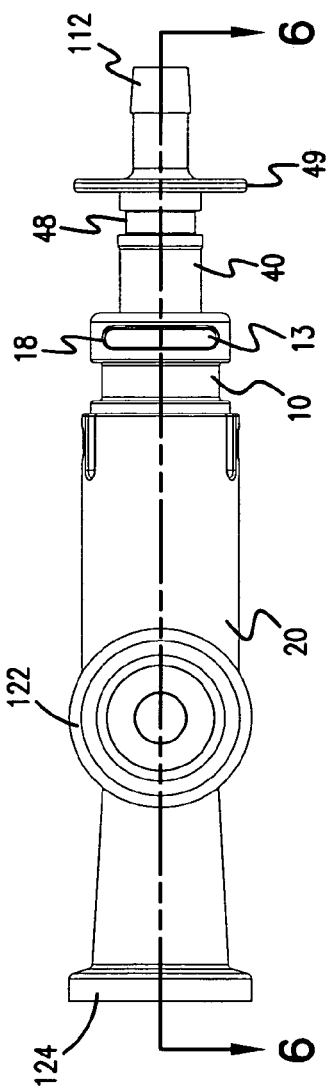

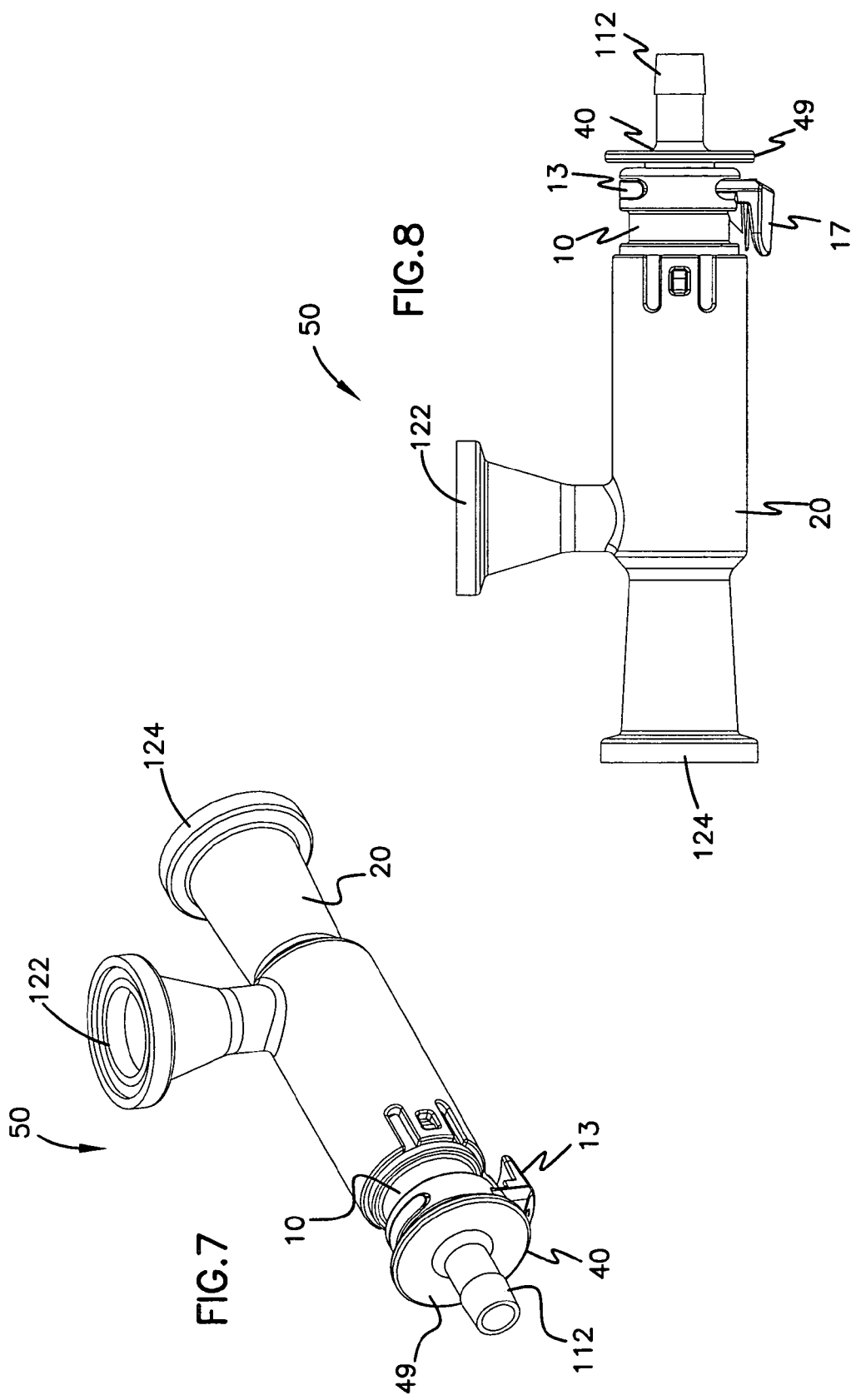

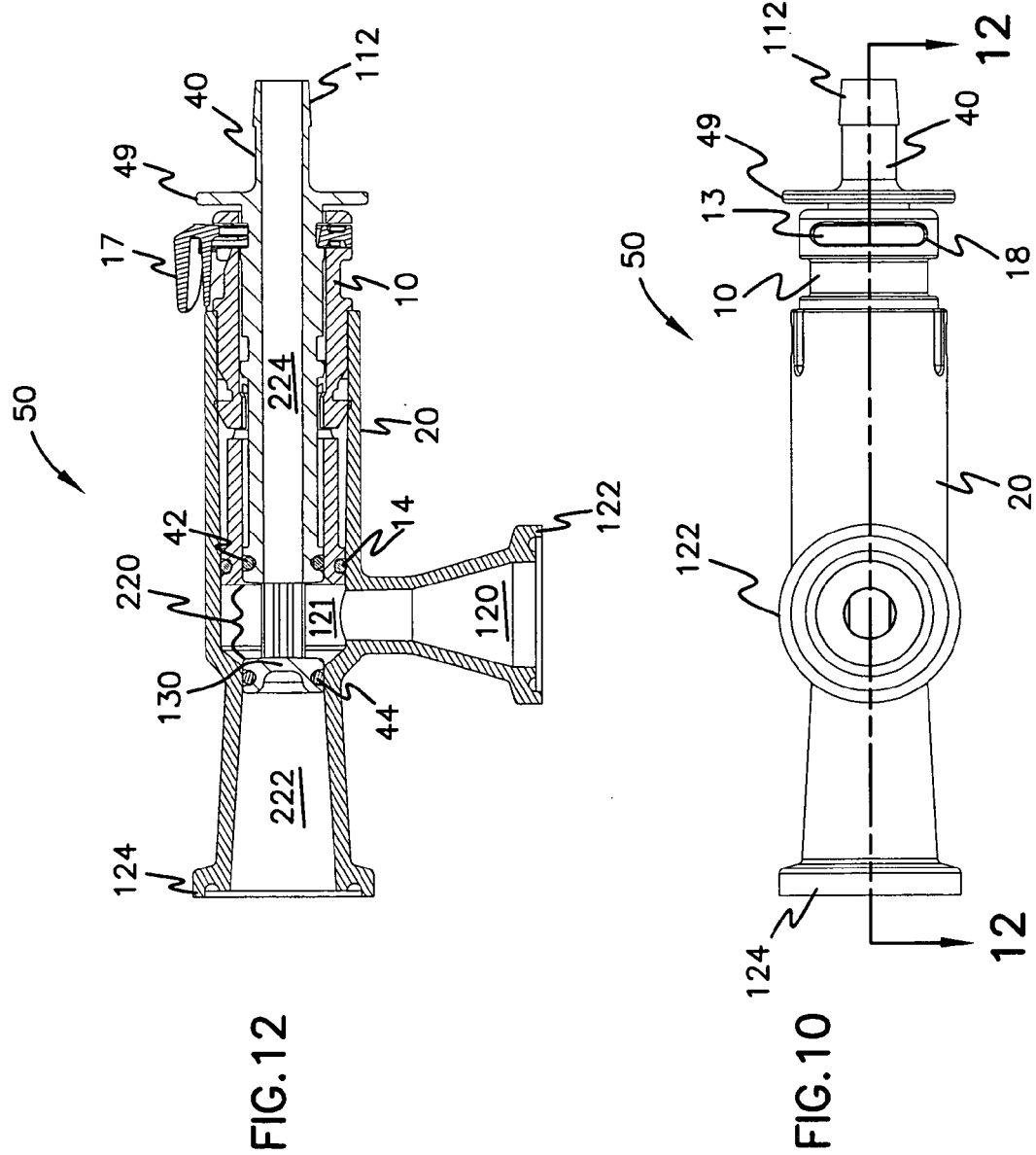

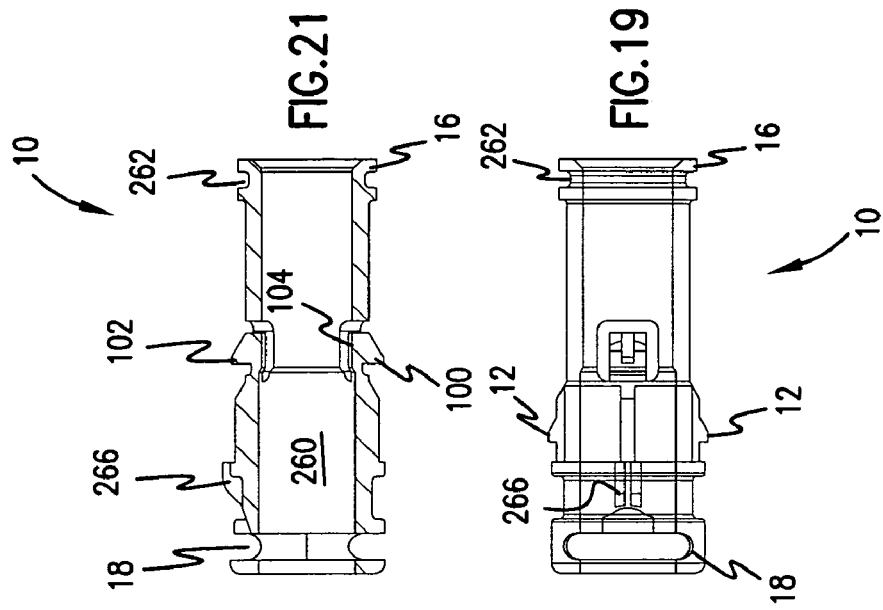
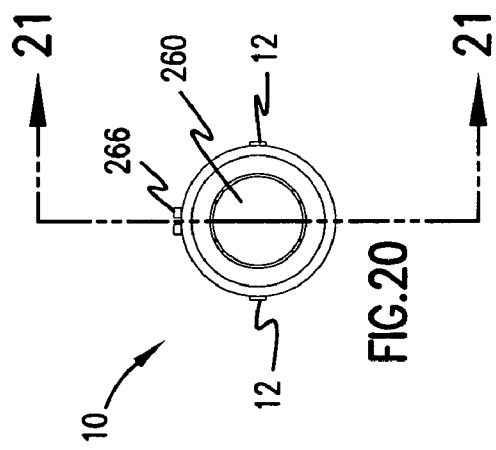
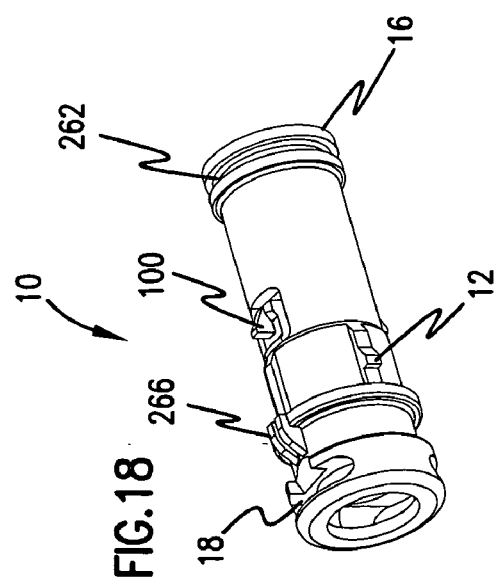

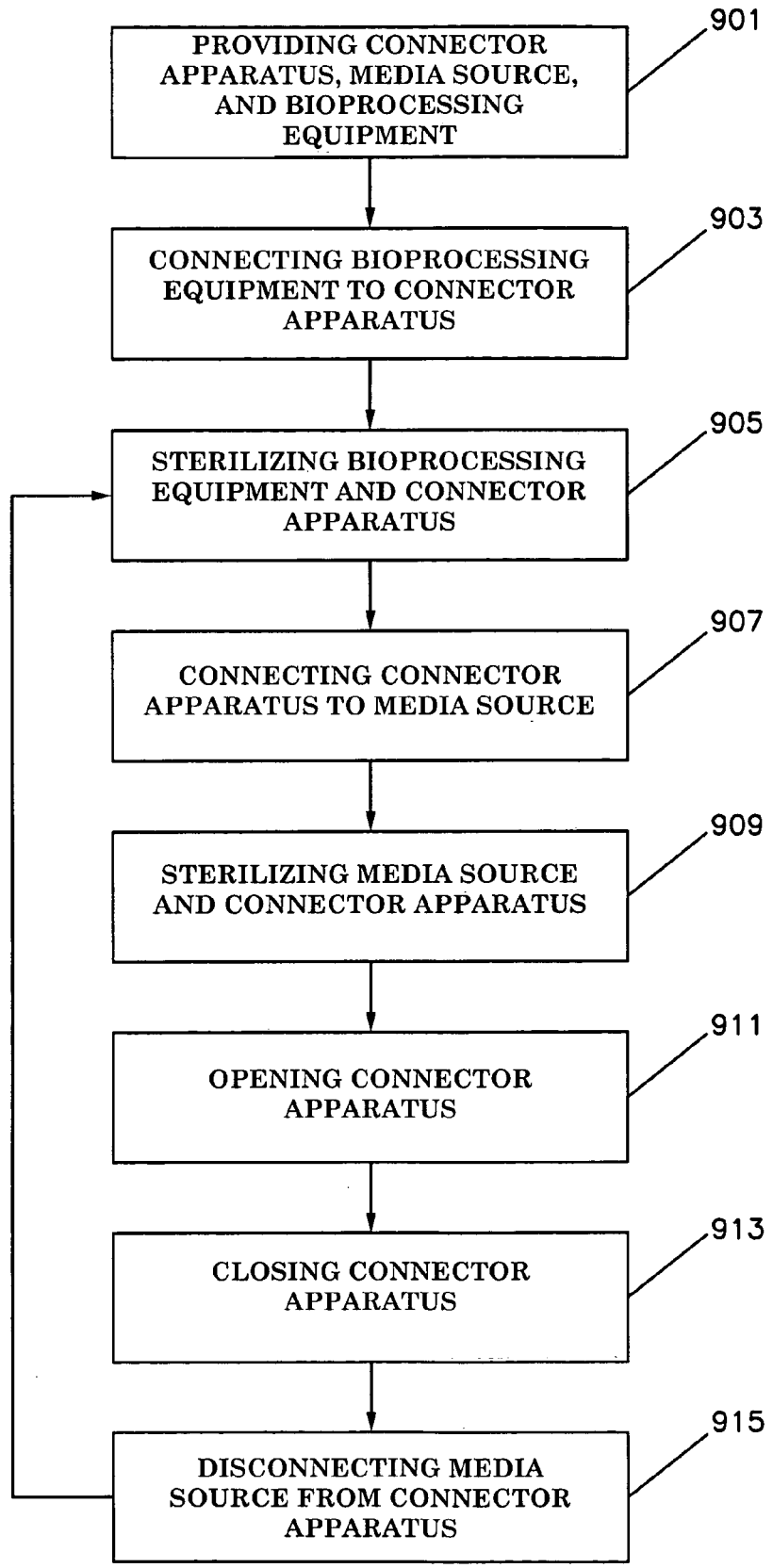

CONNECTOR APPARATUS AND METHOD OF COUPLING BIOPROCESSOR EQUIPMENT TO A MEDIA SOURCE

RELATED APPLICATION

This application claims the benefit of U.S. Patent Provisional Application Ser. No. 60/501,357, filed Sep. 9, 2003, and entitled "Connector Apparatus and Method of Coupling Bioprocessing Equipment to a Media Source," the entirety of which is hereby incorporated by reference.

TECHNICAL FIELD

This invention relates to a connector apparatus and a method for implementing the same. More particularly, this invention relates to a connector apparatus for coupling a media source to a bioreactor in a sterilized environment.

BACKGROUND

Bioprocessing systems are widely used for culturing biomaterial or producing and designing drugs used in pharmaceutical applications. Typically, these systems employ bioreactors and media dispensers connected by tube and valve assemblies. Multiple steam traps and a flow hood are often incorporated to sterilize the system from contaminants. Typically, bioreactors or culture environments and media dispensers have consisted of large vats for producing such biomaterials. Typically, the components used in the assembly were reusable stainless steel components. However, this can require a complex and time consuming coupling procedure. In addition, flow hoods, such as laminar flow hoods, can be cumbersome and inconvenient as they are moved in and out of the processing environment. As more specific cultures and designer drugs are being produced, and as more specific growth media provided to a bioreactor are being developed, there is a need for an improved and less complex bioprocessing system.

Furthermore, present designs using multiple steam traps and complex tube/valve assemblies create a bioprocessing system that is difficult to operate and may allow for increased margin of error with respect to sterilization of the system. Therefore, there is a need for a less complex system that is more convenient to handle, and that can simplify the more specific pharmaceutical designs associated with particular biomaterial production.

The present invention, as described herein, provides improvements upon one or more of the above described and other shortcomings of existing bioprocessing systems and their valve assemblies.

SUMMARY

In accordance with the present invention, the above and other problems were solved by providing a connector apparatus and a sterilized assembly for bioprocessing using the connector apparatus. In addition, a method for implementing a connector apparatus is provided.

In one embodiment of the present invention, a connector apparatus includes a coupler and a connector valve having a valve member. In example embodiments, the connector apparatus can be coupled to bioprocessing equipment and a media source to allow flow therebetween.

In example embodiments, the connector apparatus can be used once or multiple times to allow flow between bioprocessing equipment and a media source.

An advantage of the present invention is that the employment of a connector apparatus can greatly simplify the parts of a coupling mechanism in a bioprocessing system. Further, it can minimize the need for cumbersome laminar flow hoods and complex valve assemblies that may use multiple steam traps. Further, multiple exchanges can be accomplished between a piece of bioprocessing equipment and several media sources while maintaining the sterility of the bioprocessing equipment and connector apparatus.

These and other various advantages and features are pointed out in the following detailed description. For a better understanding of the disclosed embodiments and their advantages, reference should also be made to the drawings which form a further part hereof, and to accompanying descriptive matter, in which there are illustrated and described specific examples of an apparatus in accordance with the invention.

DESCRIPTION OF THE DRAWINGS

Referring now to the drawings in which like reference numbers represent corresponding parts throughout:

FIG. 1 is a perspective view of one embodiment of a connector apparatus in a closed state in accordance with the principles of the present invention;

FIG. 2 is a side view of the connector apparatus of FIG. 1;

FIG. 4 is a top view of the connector apparatus of FIG. 1;

FIG. 6 is a cross-sectional view of taken along line 6—6 of the connector apparatus of FIG. 4;

FIG. 7 is a perspective view of the connector apparatus of FIG. 1 in an open state;

FIG. 8 is a side view of the connector apparatus of FIG. 7;

FIG. 10 is a top view of the connector apparatus of FIG. 7;

FIG. 12 is a cross-sectional view taken along line 12—12 of the connector apparatus of FIG. 10;

FIG. 18 is a perspective view of one embodiment of a connector valve in accordance with the principles of the present invention;

FIG. 19 is a top view of the connector valve of FIG. 18;

FIG. 20 is an end view of the connector valve of FIG. 18;

FIG. 21 is a cross-sectional view taken along line 21—21 of the connector valve of FIG. 20; and FIG. 22 is a flow diagram of an embodiment of a method of coupling a media source to a piece of bioprocessing equipment in accordance with the principles of the present invention.

Figure 3:
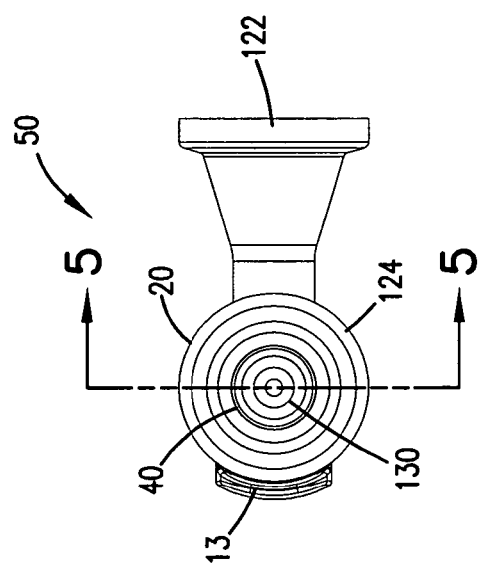
FIG. 3 is an end view of the connector apparatus of FIG. 1.

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

DETAILED DESCRIPTION

Embodiments of the present invention relate to a connector apparatus for coupling a media source to a piece of bioprocessing equipment. Embodiments of the connector apparatus disclosed herein are similar to those disclosed in U.S. patent application Ser. No. 10/097,073, entitled "Connector Apparatus and Method of Coupling a Bioprocessor to a Media Source" and filed on Mar. 12, 2002, the entirety of which is hereby incorporated by reference.

Referring now to FIGS. 1–12, one embodiment of a connector apparatus 50 is illustrated connecting a media source 70 to a piece of bioprocessing equipment 90. In FIG. 1, the connector apparatus 50 includes a coupler 20 (see FIGS. 13 and 14) and a connector valve 10 (see FIGS. 18–21). The connector valve 10 includes a valve member 40 (see FIGS. 15–17) disposed therein.

As shown in FIG. 1, the valve member 40 includes an end 112 suitable for attachment to the media source 70. The end 112, as depicted in FIG. 1, is shown as a barbed end for attachment to a media source, such as 70. However, there may be other interfaces that can be used to achieve the same result.

The coupler 20 has an outlet 122 for passage of media and connection to the piece of bioprocessing equipment 90, such as but not limited to a bioreactor. The outlet 122, as depicted in FIG. 1, is shown as a sanitary flange. However, there may be other interfaces that can be used to achieve the same result.

Also depicted is a second outlet 124 of coupler 20 for allowing steam passage to a steam trap or a condensate outlet during, for example, sterilization as described below. A sanitary flange similar to that of outlet 122 is disposed at the second outlet 124. However, it will be appreciated that an O-ring seal also can be used at the second outlet 124.

Figure 14:
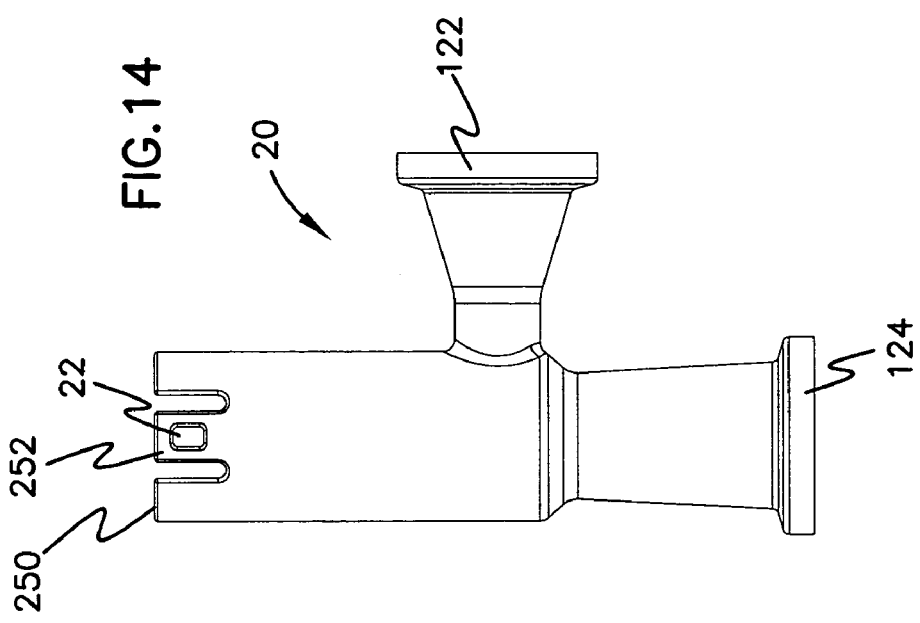
FIG. 14 is a side view of the coupler of FIG. 13.
Figure 13:
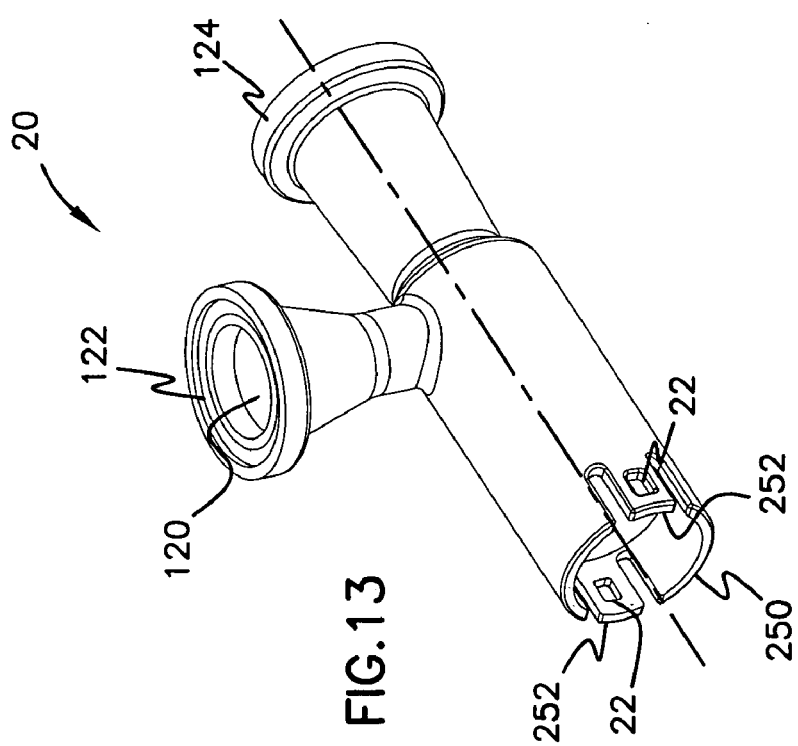
FIG. 13 is a perspective view of one embodiment of a coupler in accordance with the principles of the present invention.

Referring now to FIGS. 13 and 14, coupler 20 includes outlets 122 and 124 noted above as well as an opening 250 for receiving the connector valve 10. Coupler 20 also includes flanges 252 defined by slots running through to the opening 250, and each flange 252 defines an aperture 22 for receiving tabs 12 of the connector valve 10, as described further below.

Figure 5:
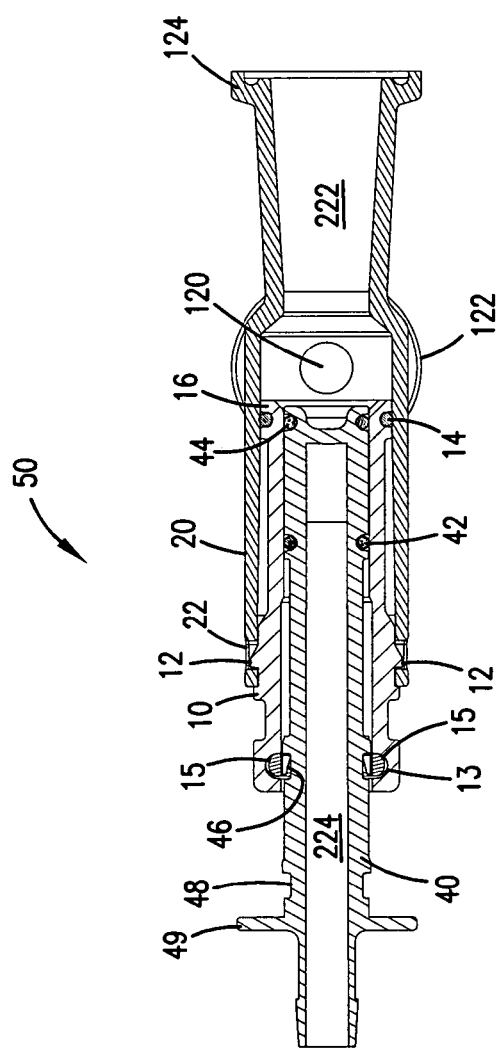
FIG. 5 is a cross-sectional view taken along line 5—5 of the connector apparatus of FIG. 3.
Figure 9:
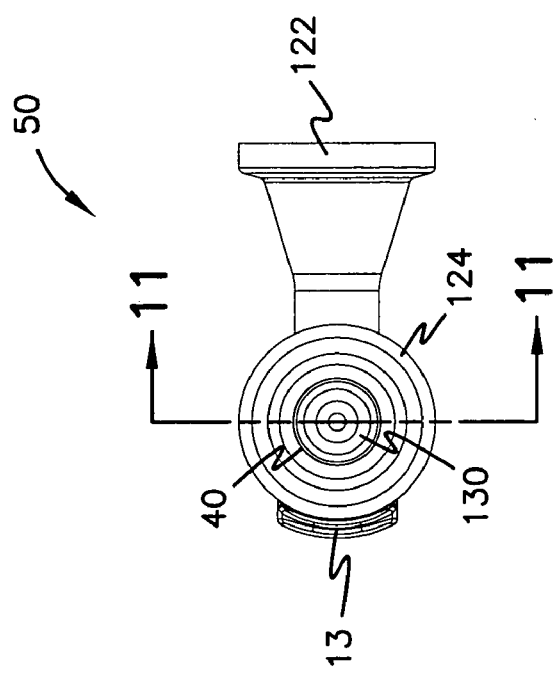
FIG. 9 is an end view of the connector apparatus of FIG. 7.
Figure 11:
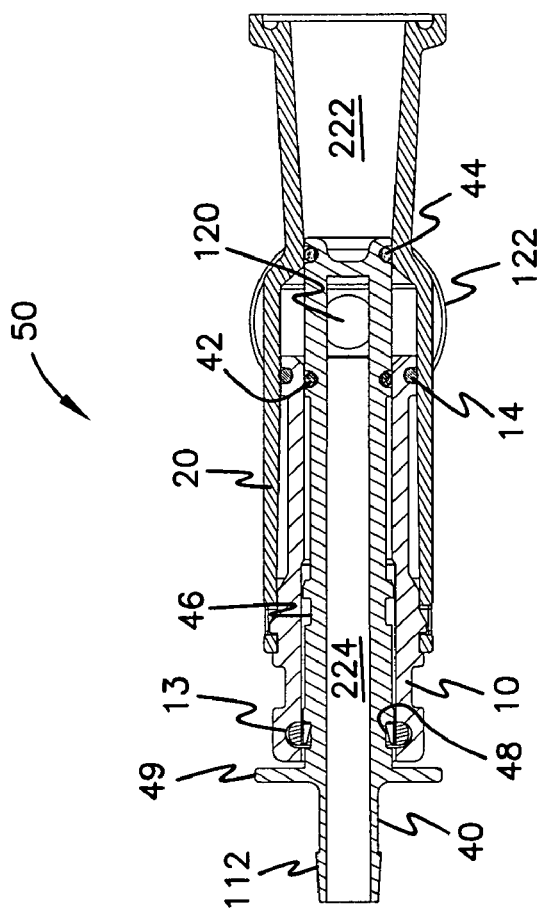
FIG. 11 is a cross-sectional view taken along line 11—11 of the connector apparatus of FIG. 9.

As shown more particularly in FIGS. 5 and 6, the connector valve 10 is disposed within the coupler 20. Referring now to FIGS. 18–21, the connector valve 10 defines a passage 260 sized to receive valve member 40. Tabs 12 on the connector valve 10 engage apertures 22 of the coupler 20 (see FIG. 13) and retain the connector valve 10 in place within the coupler 20. An O-ring seal 14 positioned in slot 262 (see FIGS. 18, 19, and 21) engages the inner diameter of the connector 20 to seal end 16 of the connector valve 10 with the coupler 20.

Figure 16:
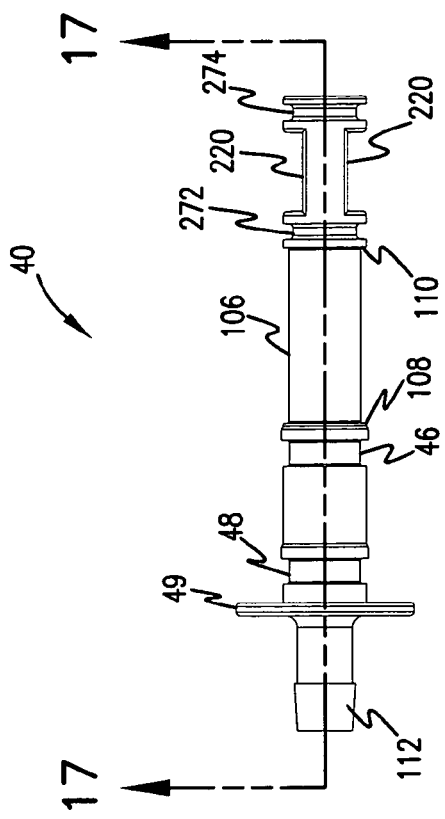
FIG. 16 is a side view of the valve member of FIG. 15.
Figure 17:
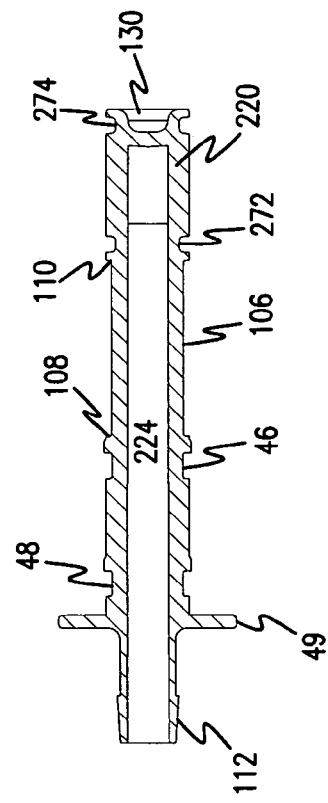
FIG. 17 is a cross-sectional view taken along line 17—17 of the valve member of FIG. 16.
Figure 15:
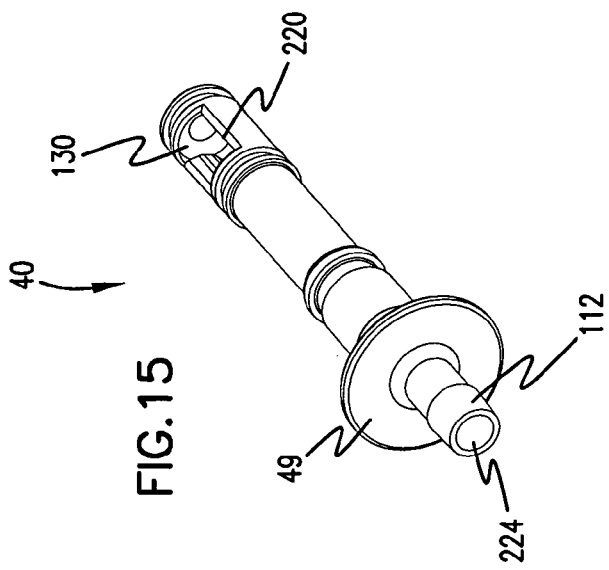
FIG. 15 is a perspective view of one embodiment of a valve member in accordance with the principles of the present invention.

Referring now to FIGS. 15–17, valve member 40 defines a passage 224 from end 112 to end 130. While end 112 is open and in fluid communication with passage 224, end 130 is closed. In addition, apertures 220 are formed adjacent end 130 and are in fluid communication with passage 224.

Referring again to FIGS. 5 and 6, the valve member 40 is disposed within the connector valve 10. O-ring seals 42 and 44 positioned in slots 272 and 274 (see FIGS. 16 and 17) of the valve member 40 engage the inner diameter of the connector valve 10 to seal the outer diameter of the valve member 40 with the connector valve 10.

In the illustrated embodiment, a clip member 13 is held in an aperture 18 formed in the connector valve 10 (see FIGS. 18 and 19) and surrounds a portion of the valve member 40. The clip member 13 can be configured as described in U.S. Pat. No. 5,052,725 to Meyer et al., the entirety of which is hereby incorporated by reference. The clip member 13 functions to maintain the valve member 40 in a fixed longitudinal position with respect to the connector valve 10.

More specifically, the clip member 13 can be actuated to allow longitudinal displacement of the valve member 40 with respect to the connector valve 10 between a closed position (FIGS. 1–6) and an open position (FIG. 7–12). For example, in the closed position as shown in FIGS. 1–6, a portion 15 of the clip member 13 is positioned in a slot 46 formed in the valve member 40 to retain the valve member 40 in place.

The clip member 13 can be actuated by pressing tab portion 17, which then allows the valve member 40 to be moved longitudinally with respect to the connector valve 10 to an open position. Tab 266 of the connector valve 10 (see FIG. 18) functions to bias the clip member 13 into the closed position. With the clip 13 actuated, the valve member 40 can be moved longitudinally by, for example, exerting force on (i.e., pushing) winged portion 49 of the valve member 40. When the fully open position is reached, portion 15 of the clip member 13 is positioned in a slot 48 formed in the valve member 40 to retain the valve member 40 in place.

Likewise, the valve member 40 can be moved back to the closed position by actuating the clip member 13 by pressing tab portion 17 and then moving the valve member 40 longitudinally back to the closed position by, for example, exerting force on (i.e., pulling) the winged portion 49. When the fully closed position is reached, portion 15 of the clip member 13 is once again positioned in the slot 46 formed in the valve member 40 to retain the valve member 40 in place.

As illustrated in the example embodiment, portion 15 of the clip member 13 is angled from a leading to a trailing edge so that the valve member 40 can be moved from the closed to the open position without requiring actuation of the clip member 13. This is accomplished by the angled surface of the portion 15 functioning as a ramp to allow the clip member 13 to be more easily moved out of slot 46 of the valve member 40 when moved from the closed to the open position (see FIG. 5). However, once in the open position, the trailing edge of the portion 15 is fully seated within slot 48 (see FIG. 11) so that it is difficult to move the valve member 40 from the open position to the closed position without actuating the clip member 13. In alternative embodiments, the angle in portion 15 of the clip member 13 can be removed, so that it is difficult to move the valve member 40 from both the closed to the open position and the open to the closed position without actuation of the clip member 13.

Referring to FIGS. 6 and 12, the valve member 40 is slidingly retained in the connector valve 10 by arms 100 of the connector valve 10. The arms 100 are moveable radially with respect to the connector valve 10 and include tips 102 that extend beyond the outer diameter of the connector valve 10 that is inserted into the coupler 20. Therefore, when the valve member 40 is positioned in the coupler 20, the tips 102 of the arms 100 contact the inner diameter of the coupler 20 and the arms 100 are radially biased inwardly. In such an arrangement, an inner end 104 of each arm 100 is positioned within a slot 106 formed on the valve member 40. With the inner ends 104 positioned in the slot 106, the valve member 40 can therefore only move longitudinally between ends 108 and 110 of the slot (see FIGS. 16 and 17). Therefore, the valve member 40 cannot be pulled beyond the fully closed position (see FIG. 6) because the arms 100 contact the end 110 of the slot.

When the valve member 40 is in the closed position as shown in FIG. 6, material can flow from outlet 122 of the coupler 20, through passage 120, into junction 121, and through passage 222 to outlet 124 (reverse flow is also possible). However, because inner end 16 of the connector valve 10 is sealed by O-ring seal 14 against the coupler 20 and end 130 of the valve member 40 is sealed by O-ring seal 44 against the connector valve 10, no material can flow into passage 224 and to end 112 of the valve member 40.

Conversely, when the valve member 40 is in the open position as shown in FIG. 12, end 130 of the valve member 40 has been longitudinally displaced through junction 121 and into passage 222 of the coupler 20 such that O-ring seal 44 engages an inner diameter of the passage 222 of coupler 20. In addition, O-ring seal 42 now seals the valve member 40 against the connector valve 20 adjacent to the junction 121 such that passage 224 in valve member 40 is fluidly connected to junction 121 through apertures 220 formed in valve member 40 (see FIGS. 15–17).

In this open configuration for valve member 40, material can flow from outlet 122 of the coupler 20, through passage 120, into junction 121, through aperture 220 formed in valve member 40 (see FIGS. 15–17) and through passage 224 to outlet 112 of the valve member 40 (reverse flow is also possible). However, because end 130 of the valve member 40 is sealed by O-ring seal 44 against the inner diameter of passage 222 of coupler 20, no material can flow into passage 222 and to end 124 of the coupler 20.

In a like manner, valve member 40 can be longitudinally displaced back into the closed position (see FIG. 6) to reestablish fluid communication between passages 120 and 222, and to foreclose communication with passage 224 of valve member 40.

In example embodiments, the connector apparatus 50 can withstand steam and autoclave conditions. In addition, the connector apparatus 50 can be made of a material such as polycarbonate, or a polysulphone, or a polyphenylsulfide and including other high temperature thermoplastics or materials, which can be injection molded.

The media source can be a media bag or other like media vessel. The piece of bioprocessing equipment may be a bioreactor and can include a steam source for sterilization. The dimensions for a bioreactor and media source are specific to the needs of the biomaterial being processed and are further not described here.

FIG. 22 illustrates an example flow diagram of a method for coupling a bioreactor with a media source using an example connector apparatus disclosed herein. The method includes, at 901, providing a connector apparatus, a media source, and a piece of bioprocessing equipment as detailed in the above descriptions. The connector apparatus is then connected to the bioprocessing equipment at 903.

Next, the bioprocessing equipment and the connector apparatus are sterilized at 905. In one embodiment, the bioprocessing equipment and the coupler are steam sterilized, and outlet 124 of coupler 20 functions as a steam trap or condensate outlet.

Next, the media source is coupled to the connector apparatus at 907, and the media source and connector apparatus are sterilized at 909 using, for example, gamma sterilization. After this sterilization is completed, the entire assembly including the media source, connector apparatus, and piece of bioprocessing equipment are ready for use.

Next, the connector apparatus is opened at 911 by moving the valve member 40 from the closed position to the open position as described above. In this position, media can flow from the bioprocessing equipment to the media source, or vice versa.

Next, the flow of media between the bioprocessing equipment and the media source can be stopped at 913 by closing the connector apparatus through actuation of the valve member 40 from the open position to the closed position as described above. Once flow has been terminated, the media source can be disconnected from the connector apparatus at 915.

If desired, the connector apparatus can then be reused. For example, the bioprocessing equipment and connector apparatus can be sterilized again at 905, and a media source can be connected to the connector apparatus and sterilized at 907 and 909. Next, the connector apparatus can be opened at 911, allowing media to flow between the bioprocessing equipment and media source. Next, the connector apparatus can be closed at 913, and the media source can be disconnected at 915.

In this manner, the connector apparatus can be used once or multiple times, as desired. Further, multiple exchanges can be accomplished between a piece of bioprocessing equipment and several media sources while maintaining the sterility of the bioprocessing equipment and connector apparatus.

Further, the connector apparatus provides a more convenient and practical way of connecting bioprocessing equipment with a media source. In addition, the connector apparatus provides a versatile means for coupling that can be easily modified to accommodate a range of needs with respect to particular biomaterials processed.

Various modifications can be made to the example embodiments disclosed herein. For example, although the coupler 20 and connector valve 10 are illustrated herein as separate pieces, they can also be formed as one integral piece. Having described the embodiments of the present invention, other modifications and equivalents may occur to one skilled in the art. It is intended that such modifications and equivalents shall be included with the scope of the invention.

What is claimed is:

1. A connector apparatus, comprising:
   a coupler including an end and first and second outlets;
   a connector valve comprising a valve member defining an inlet at a first end of the valve member, and an inlet passage extending longitudinally through the valve member from the first end to a second end of the valve member; and
   a clip member attached to the coupler, the clip member allowing the valve member to be moved from a closed configuration to an open configuration, and from the open configuration to the closed configuration;
   wherein the valve member forms a fluid tight seal upstream of the first outlet of the coupler in the closed configuration;
   wherein the valve member forms a fluid tight seal downstream of the first outlet of the coupler in the open configuration; and
   wherein the second outlet is in fluid communication with the first outlet when the coupler is in the closed configuration.

2. The connector apparatus according to claim 1, wherein the coupler and the connector valve are initially in the closed configuration upon engagement, the clip member being configured to allow movement of the valve member toward the coupler into the open configuration, and being configured to allow movement of the valve member away from the coupler into the closed configuration.

3. The connector apparatus according to claim 1, wherein the clip member is configured to allow multiple actuations into the open and closed configurations.

4. The connector apparatus according to claim 1, wherein the valve member is engageable with the coupler at two locations; the two locations being a first location defined as the closed configuration and a second location defined as the open configuration.

5. The connector apparatus according to claim 1, wherein the coupler, the connector valve, and the valve member are configured to be reusable.

6. The connector apparatus according to claim 1, wherein the connector valve defines an aperture through which the clip member extends.

7. The connector apparatus according to claim 6, wherein the clip member surrounds a portion of the valve member.

8. The connector apparatus according to claim 7, wherein the clip member is actuatable in a direction perpendicular to a direction of movement of the valve member to allow the valve member to be moved from the closed to the open configurations and from the open to the closed configurations.

9. The connector apparatus according to claim 8, wherein the clip member defines open and closed positions, wherein the clip member allows movement of the valve member while the clip member is in the open position and restricts movement of the valve member while the clip member is in the closed position, and wherein the clip member is biased into the closed position.

10. The connector apparatus according to claim 8, wherein the valve member defines two slots, the first slot defining the closed configuration when the clip member is positioned in the first slot, and the second slot defining the open configuration with the clip member is positioned in the second slot.

11. The connector apparatus according to claim 1, wherein the coupler and the connector valve are constructed of an injection molded high temperature thermoplastic material consisting of polycarbonate, polysulphone, or polyphenylsulfide.

12. The connector apparatus according to claim 1, wherein the inlet of the valve member is in fluid communication with the first outlet of the coupler when the coupler is in the open configuration.

13. A sterilized assembly for bioprocessing comprising:
a media source;
a connector apparatus connected to the media source at an inlet, the connector apparatus including a coupler including an end and first and second outlets, a connector valve comprising a valve member defining the inlet at a first end of the valve member, and an inlet passage extending longitudinally through the valve member from the first end to a second end of the valve member, and a clip member attached to the coupler, the clip member allowing the valve member to be moved from a closed configuration to an open configuration, and from the open configuration to the closed configuration, wherein the valve member forms a fluid tight seal upstream of the first outlet of the coupler in the closed configuration, wherein the valve member forms a fluid tight seal downstream of the first outlet of the coupler in the open configuration, and wherein the second outlet is in fluid communication with the first outlet when the coupler is in the closed configuration; and
a piece of bioprocessing equipment connected with the connector apparatus to couple the media source with the piece of bioprocessing equipment.

14. The assembly according to claim 13, wherein the connector valve defines an aperture through which the clip member extends.

15. The assembly according to claim 14, wherein the clip member surrounds a portion of the valve member.

16. The assembly according to claim 15, wherein the clip member is actuatable in a direction perpendicular to a direction of movement of the valve member to allow the valve member to be moved from the closed to the open configurations and from the open to the closed configurations.

17. The assembly according to claim 16, wherein the clip member defines open and closed positions, wherein the clip member allows movement of the valve member while the clip member is in the open position and restricts movement of the valve member while the clip member is in the closed position, and wherein the clip member is biased into the closed position.

18. The assembly according to claim 16, wherein the valve member defines two slots, the first slot defining the closed configuration when the clip member is positioned in the first slot, and the second slot defining the open configuration with the clip member is positioned in the second slot.

19. The assembly according to claim 13, wherein the inlet of the valve member is in fluid communication with the first outlet of the coupler when the coupler is in the open configuration.

20. The assembly according to claim 19, wherein the bioprocessing equipment is connected to the first outlet of the coupler, and wherein the media source is in fluid communication with the bioprocessing equipment when the coupler is in the open configuration.

21. A connector apparatus, comprising:
a coupler including an end and first and second outlets;
a connector valve located at least partially within the coupler, an outer circumference of the connector valve including a first seal forming a seal between the outer circumference of the connector valve and the coupler;
a valve member located at least partially within the connector valve and configured to move within the connector valve between closed and open positions, the valve member defining an interior passage, and an opening surrounded by a first circumferential seal located upstream of the opening and a second circumferential seal located downstream of the opening adjacent to an end of the valve member; and
a clip member attached to the coupler, the clip member allowing the valve member to be moved from the closed position to the open position, and from the open position to the closed position;
wherein the second circumferential seal of the valve member forms a fluid tight seal upstream of the first outlet of the coupler in the closed position;
wherein the second outlet is in fluid communication with the first outlet when the coupler is in the closed position;
wherein the second circumferential seal of the valve member forms a fluid tight seal downstream of the first outlet of the coupler in the open position;

wherein the opening of the valve member is in fluid communication with the second outlet through the opening in the valve member when the coupler is in the open position; and wherein, as the valve member moves from the closed position to the open position, the end of the valve member including the second circumferential seal travels through a junction formed between the first and second outlets, the junction including a diameter larger than an internal diameter of the connector valve.

* * * * *